(12) United States Patent
Kwon et al.

(10) Patent No.: US 7,945,003 B2
(45) Date of Patent: May 17, 2011

(54) METHOD AND APPARATUS FOR DETECTING OFFSET IN AN ORTHOGONAL FREQUENCY DIVISION MULTIPLEXING SYSTEM

(75) Inventors: Yun-Ju Kwon, Suwon-si (KR); Su-Jin Yoon, Suwon-si (KR)

(73) Assignee: Qualcomm Incorporated, San Diego, CA (US)

( * ) Notice: Subject to any disclaimer, the term of this patent is extended or adjusted under 35 U.S.C. 154(b) by 925 days.

(21) Appl. No.: 11/706,151

(22) Filed: Feb. 14, 2007

(65) Prior Publication Data

US 2007/0206692 A1 Sep. 6, 2007

(30) Foreign Application Priority Data

Feb. 14, 2006 (KR) .................. 10-2006-0014370

(51) Int. Cl.
*H04L 27/06* (2006.01)
(52) U.S. Cl. ........................................ 375/344
(58) Field of Classification Search .......... 375/224, 375/259–260, 285, 344, 362, 375; 370/206, 370/491, 500
See application file for complete search history.

(56) References Cited

U.S. PATENT DOCUMENTS

| 6,628,606 | B1 | 9/2003 | Hong et al. | |
|---|---|---|---|---|
| 7,012,881 | B2 * | 3/2006 | Kim | 370/208 |
| 7,203,252 | B2 * | 4/2007 | Lashkarian | 375/324 |
| 7,251,282 | B2 * | 7/2007 | Maltsev et al. | 375/260 |
| 7,463,699 | B2 * | 12/2008 | Zhang et al. | 375/316 |
| 7,558,245 | B2 * | 7/2009 | Laroia et al. | 370/350 |
| 2004/0076246 | A1 | 4/2004 | Vanderperren et al. | |
| 2004/0228270 | A1 * | 11/2004 | Chen et al. | 370/210 |
| 2008/0304607 | A1 * | 12/2008 | Birru | 375/359 |

FOREIGN PATENT DOCUMENTS

| EP | 0 917 355 | 11/1997 |
|---|---|---|
| EP | 1 414 208 | 10/2002 |
| KR | 1020040099875 A | 12/2004 |
| KR | 1020050039263 A | 4/2005 |
| WO | WO 97/46007 | 12/1997 |
| WO | WO 2006/003531 | 1/2006 |

* cited by examiner

*Primary Examiner* — Jean B Corrielus
(74) *Attorney, Agent, or Firm* — McDermott Will & Emery

(57) ABSTRACT

Disclosed is a method for detecting a frequency offset in an Orthogonal Frequency Division Multiplexing (OFDM) system. The method includes determining a first frequency index based on autocorrelation values calculated according to a frequency index for a pilot signal of a received symbol, accumulating the autocorrelation values calculated according to the frequency index for the pilot signal of the received symbol depending on a symbol count, and determining a second frequency index based on the accumulated autocorrelation values, and determining at least one of the first frequency index and the second frequency as a frequency offset according to channel quality.

16 Claims, 8 Drawing Sheets

METHOD AND APPARATUS FOR DETECTING OFFSET IN AN ORTHOGONAL FREQUENCY DIVISION MULTIPLEXING SYSTEM

PRIORITY

This application claims the benefit under 35 U.S.C. §119(a) of a Korean Patent Application filed in the Korean Intellectual Property Office on Feb. 14, 2006 and assigned Serial No. 2006-14370, the contents of which are incorporated herein by reference.

BACKGROUND OF THE INVENTION

1. Field of the Invention

The present invention relates generally to a method and apparatus for detecting a frequency offset (or frequency difference) in a communication system, and in particular, to a method and apparatus for detecting a frequency offset in an Orthogonal Frequency Division Multiplexing (OFDM) system.

2. Description of the Related Art

Generally, systems using an OFDM scheme (hereinafter OFDM systems) include IEEE802.11a-based Wireless Local Area Network (WLAN), Terrestrial—Digital TV Broadcasting (Terrestrial—Digital Multimedia Broadcasting (T-DMB) and Digital Video Broadcasting—Handheld (DVB-H)), and IEEE802.16e/IEEE802.20-based Portable Internet systems. The OFDM system is an efficient system that can transmit high-speed data even in a poor multipath fading channel environment. However, one of the major drawbacks of the OFDM system is that the system is very susceptible to a Carrier Frequency Offset value (CFO) between a transmitter and a receiver. The CFO induces Inter-Carrier Interference (ICI), causing a decrease in Bit Error Rate (BER) performance of the system.

In order to solve the problem, Non Data-Aided and Data-Aided frequency detection techniques are used. The Non Data-Aided technique detects a CFO through a correlation between a Cyclic Prefix (CP) and an original sample of the CP. However, this technique is disadvantageous in that it suffers performance degradation due to fading and delay of the time-varying channels. Therefore, the CP correlation scheme is generally used in an Acquisition Mode-based system that does not require optimal accuracy.

Accordingly, a frequency offset detection method using Data-Aided pilots has been introduced. This method is classified into a Time Domain Training Block (or preamble) method and a Continuous Pilot Allocation (or frequency band allocation) method according to an allocation method of pilot signals. The former is disadvantageous to fast fading, and the latter is disadvantageous in terms of the frequency efficiency.

FIG. 1 illustrates a receiver 100 in the conventional DVB-H system. Referring to FIG. 1, the receiver 100 includes an Analog-to-Digital Converter (ADC) 101 for converting a received analog signal into a digital signal, and a Fine Carrier frequency offset Recovery block (FCR) 105 for generating a fine carrier frequency offset value depending on received mode information, coarse symbol timing, and start position information of an FFT window.

The receiver 100 further includes a function block 107 for estimating the mode information and symbol timing, an NCO mixer 103 for mixing an output of the FCR 105 with an estimated coarse carrier frequency offset value, a Fast Fourier Transform block (FFT) 109 for converting an output signal of the mixer 103 into a time-domain signal, and a Coarse Carrier frequency offset Recovery (CCR) block 113 for estimating a coarse carrier frequency depending on the signal received from the FFT 109.

The frequency synchronization method in the receiver (or terminal) 100 includes a pre-FFT process for compensating for a fine carrier frequency offset value and a post-FFT process for compensating for a coarse carrier frequency offset value before and after the FFT 109. With use of the mode information, coarse symbol timing, and FFT start position information obtained after mode detection and coarse Symbol Timing Recovery (STR), the receiver 110 estimates a fine carrier frequency offset value. Thereafter, the receiver 110 performs FFT, and performs a CCR process using the OFDM symbols output from the FFT and information on the known continual pilots.

A method for estimating a CFO in the conventional receiver 110 includes a confidence check scheme in the Continuous Pilot Allocation method. The confidence check scheme is a method for detecting a coarse frequency offset by comparing the values designated in a preset confidence check counter with the associated continual resulting values. If the predetermined values and the continual resulting values are not output, this method needs a new OFDM symbol to detect a coarse frequency offset, causing an increase in the time for detection of the coarse frequency offset. As a result, due to the failure of fast frequency synchronization, the receiver 100 suffers from ICI for a longer time, causing a reduction in the final BER performance. In addition, the logic for coarse frequency detection operates for a longer time, causing an increase in the dynamic power consumption.

SUMMARY OF THE INVENTION

An aspect of the present invention is to address at least the problems and/or disadvantages and to provide at least the advantages described below. Accordingly, an aspect of the present invention is to provide a coarse frequency detection method and apparatus capable of increasing system performance in an OFDM system.

Another aspect of the present invention is to provide a coarse frequency detection method and apparatus capable of increasing its accuracy with lower complexity in an OFDM system.

A further aspect of the present invention is to provide a coarse frequency detection method and apparatus capable of reducing power consumption in an OFDM system.

According to the present invention, there is provided a method for detecting a frequency offset in an OFDM system, including determining a first frequency index based on autocorrelation values calculated according to a frequency index for a pilot signal of a received symbol, accumulating the autocorrelation values calculated according to the frequency index for the pilot signal of the received symbol depending on a symbol count, and determining a second frequency index based on the accumulated autocorrelation values, and determining at least one of the first frequency index and the second frequency as a frequency offset according to channel quality.

The determination of a first frequency index includes selecting a frequency index corresponding to the maximum autocorrelation value among the autocorrelation values based on the frequency index in the pilot signal of the received symbol, and determining the selected frequency index as the first frequency index if the selected frequency index is equal to a frequency index calculated in a previous symbol a set number of times.

The determination of a second frequency index includes accumulating the calculated autocorrelation values and autocorrelation values in a previous symbol, and determining a frequency index having the maximum autocorrelation value as the second frequency index if the accumulated count is the maximum symbol accumulation count.

The determination of at least one of the first frequency index and the second frequency as a frequency offset includes determining the first frequency index as a frequency offset if the channel quality is higher than a threshold, and determining the second frequency index as a frequency offset if the channel quality is lower than the threshold.

According to the present invention, there is provided an apparatus for detecting a frequency offset in an OFDM system, including a first means for determining a first frequency index based on autocorrelation values calculated according to a frequency index for a pilot signal of a received symbol, a second means for accumulating the autocorrelation values calculated according to the frequency index for the pilot signal of the received symbol depending on a symbol count, and determining a second frequency index based on the accumulated autocorrelation values, and a lock detector for determining at least one of the first frequency index and the second frequency as a frequency offset according to channel quality.

The first means includes a maximum value detector for detecting the maximum autocorrelation value among the autocorrelation values based on the frequency index in the pilot signal of the received symbol, and a soft combining detector for determining the selected frequency index as the first frequency index if a frequency index corresponding to the detected maximum value is equal to a frequency index calculated in a previous symbol a set number of times.

The second means includes a buffer for accumulating the calculated autocorrelation values and autocorrelation values in a previous symbol, and a confidence check detector for determining a frequency index having the maximum autocorrelation value as the second frequency index if the accumulated count is the maximum symbol accumulation count.

The lock detector determines the first frequency index as a frequency offset if the channel quality is higher than a threshold, and determines the second frequency index as a frequency offset if the channel quality is lower than the threshold.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
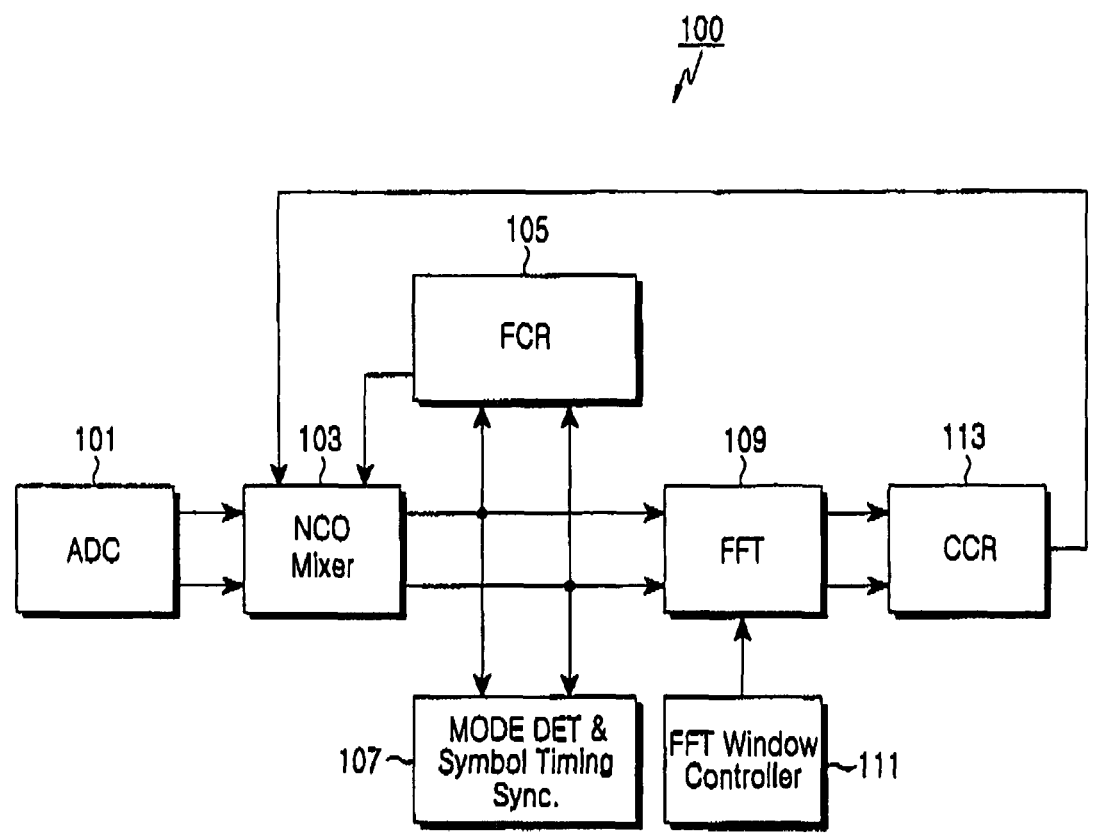
FIG. 1 illustrates a receiver in the conventional DVB-H system.

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for the sake of clarity and conciseness.

A coarse frequency detection apparatus of an OFDM system according to the present invention operates the conventional confidence check scheme and a soft combining scheme for combining symbols of a received signal, in combination, in order to detect an accurate coarse frequency with minimum complexity.

A description will now be made of a coarse frequency detection method based on the confidence check scheme.

A CCR block, or coarse carrier frequency detection apparatus, is a block for compensating for coarse offset of carrier frequency spacing, and is achieved through two continual OFDM symbols after FFT operation. In order to compensate for a Coarse carrier Frequency Offset (CFO), the coarse carrier frequency detection apparatus uses a continual pilot, which is one of the pilots applied to DVB-H. The continual pilot is located in every OFDM symbol in the same manner, and is transmitted at a boosted power level. A position of a continual pilot in each mode is shown in Table 1.

TABLE 1

| Continual pilot carrier positions (index number k) | | | | | | | | | | | | | |
|---|---|---|---|---|---|---|---|---|---|---|---|---|---|
| 2K mode | | | | | | | 8K mode | | | | | | |
| 0 | 48 | 54 | 87 | 141 | 156 | 192 | 0 | 48 | 54 | 87 | 141 | 156 | 192 |
| 201 | 255 | 279 | 282 | 333 | 432 | 450 | 201 | 255 | 279 | 282 | 333 | 432 | 450 |
| 483 | 525 | 531 | 618 | 636 | 714 | 759 | 483 | 525 | 531 | 618 | 636 | 714 | 759 |
| 765 | 780 | 804 | 873 | 888 | 918 | 939 | 765 | 780 | 804 | 873 | 888 | 918 | 939 |
| 942 | 969 | 984 | 1050 | 1101 | 1107 | 1110 | 942 | 969 | 984 | 1050 | 1101 | 1107 | 1110 |
| 1137 | 1140 | 1146 | 1206 | 1269 | 1323 | 1377 | 1137 | 1140 | 1146 | 1206 | 1269 | 1323 | 1377 |
| 1491 | 1683 | 1704 | | | | | 1491 | 1683 | 1704 | 1752 | 1758 | 1791 | 1845 |
| | | | | | | | 1860 | 1896 | 1905 | 1959 | 1983 | 1986 | 2037 |
| | | | | | | | 2136 | 2154 | 2187 | 2229 | 2235 | 2322 | 2340 |
| | | | | | | | 2418 | 2463 | 2469 | 2484 | 2508 | 2577 | 2592 |
| | | | | | | | 2622 | 2643 | 2646 | 2673 | 2688 | 2754 | 2805 |
| | | | | | | | 2811 | 2814 | 2841 | 2844 | 2850 | 2910 | 2973 |
| | | | | | | | 3027 | 3081 | 3195 | 3387 | 3408 | 3456 | 3462 |
| | | | | | | | 3495 | 3549 | 3564 | 3600 | 3609 | 3663 | 3687 |
| | | | | | | | 3690 | 3741 | 3840 | 3858 | 3891 | 3933 | 3939 |
| | | | | | | | 4026 | 4044 | 4122 | 4167 | 4173 | 4188 | 4212 |
| | | | | | | | 4281 | 4296 | 4326 | 4347 | 4350 | 4377 | 4392 |
| | | | | | | | 4458 | 4509 | 4515 | 4518 | 4545 | 4548 | 4554 |

TABLE 1-continued

Continual pilot carrier positions (index number k)

| 2K mode | 8K mode | | | | | | |
|---|---|---|---|---|---|---|---|
| | 4614 | 4677 | 4731 | 4785 | 4899 | 5091 | 5112 |
| | 5160 | 5166 | 5199 | 5253 | 5268 | 5304 | 5313 |
| | 5367 | 5391 | 5394 | 5445 | 5544 | 5562 | 5595 |
| | 5637 | 5643 | 5730 | 5748 | 5826 | 5871 | 5877 |
| | 5892 | 5916 | 5985 | 6000 | 6030 | 6051 | 6054 |
| | 6081 | 6096 | 6162 | 6213 | 6219 | 6222 | 6249 |
| | 6252 | 6258 | 6318 | 6381 | 6435 | 6489 | 6603 |
| | 6795 | 6816 | | | | | |

Figure 2:
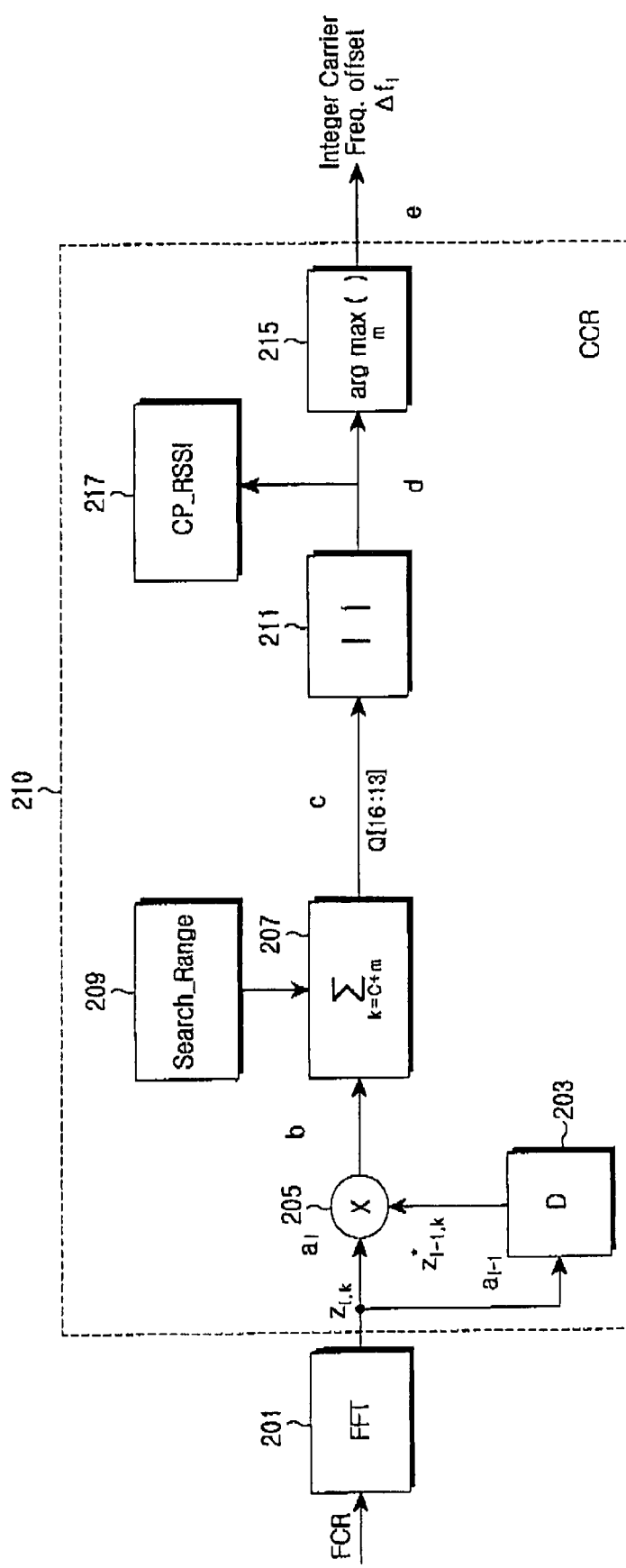
FIG. 2 illustrates a general coarse frequency detection apparatus.

FIG. 2 illustrates a coarse frequency detection apparatus in an OFDM system.

Referring to FIG. 2, an FFT 201 receives a Fine Carrier Frequency (FCR)-compensated signal, and performs an FFT process thereon. After the FFT process in the FFT 201, a multiplier 205 performs a multiplication operation on two continual OFDM symbols of conjugated $Z_{l-1,k}$ and $Z_{l,k}$. Conjugation of $Z_{l-1,k}$ is implemented by a Delay (D) 203. Here, l and k denote a symbol number and a carrier number, respectively.

Thereafter, an accumulator 207 calculates a sum of power in a continual pilot position (k=C+m) expected in a corresponding interval using a search range (Search_Range) value m set in a memory 209 according to each FFT mode and a frequency bandwidth, and position information C of a continual pilot stored in a Read-Only Memory (ROM) table.

The number of continual pilots (or continual pilot count) differs according to FFT mode as shown in Table 1. However, because positions of continual pilots for 2K and 4K modes are subsets of positions for an 8K mode, the coarse frequency detection apparatus stores the positions of continual pilots for the 8K mode in a ROM table, and then controls ROM table address accessing using a counter included therein, thereby making it possible to use them in all modes. Here, the coarse frequency detection apparatus performs a CCR operation using the property that the continual pilots, compared with the general data carriers, are transmitted with boosted power for stable reception, and also using a correlation of continual pilot carriers between a previous symbol and the current symbol.

For a 100-ppm oscillator and an 800-MHz frequency band, the values shown in Table 2 can be obtained for the Search_Range. Therefore, after the accumulator 207 calculates the sum of power in all expected continual pilot positions for the corresponding Search_Range, an absolute value calculator 211 calculates an absolute value thereof. Thereafter, a maximum correlation index extractor 215 extracts the maximum value among the resulting values. Here, the sum in the position where an expected position of a continual pilot is accurate will be greater than the sums in other intervals. As a result, the search range value m given when an absolute value of the power sum in the expected continual pilot position has the maximum value is a desired CFO value $\Delta f_1$. This algorithm is expressed as Equation (1).

$$\Delta f_I = \arg\max \left| \sum_{k=C+m} x_k \right| \quad (1)$$

where $x_k = z_{l,k} \cdot z_{l-1,k}^*$

TABLE 2

| Bandwidth | FFT Mode | Search Range (m) | Carrier Spacing (KHz) |
|---|---|---|---|
| 8 MHz | 2K Mode | [−18, 18] | 4.464 |
| | 4K Mode | [−36, 36] | 2.232 |
| | 8K mode | [−72, 72] | 1.116 |
| 7 MHz | 2K Mode | [21, 21] | 3.9 |
| | 4K Mode | [−41, 41] | 1.953 |
| | 8K Mode | [−82, 82] | 0.977 |
| 6 MHz | 2K Mode | [−24, 24] | 3.35 |
| | 4K Mode | [−48, 48] | 1.67 |
| | 8K Mode | [−96, 96] | 0.84 |
| 5 MHz | 2K Mode | [−29, 29] | 2.79 |
| | 4K Mode | [−58, 58] | 1.395 |
| | 8K mode | [−115, 115] | 0.697 |

The frequency detection method uses a confidence check method in order to obtain an accurate coarse carrier frequency offset value $\Delta f_1$.

Figure 3:
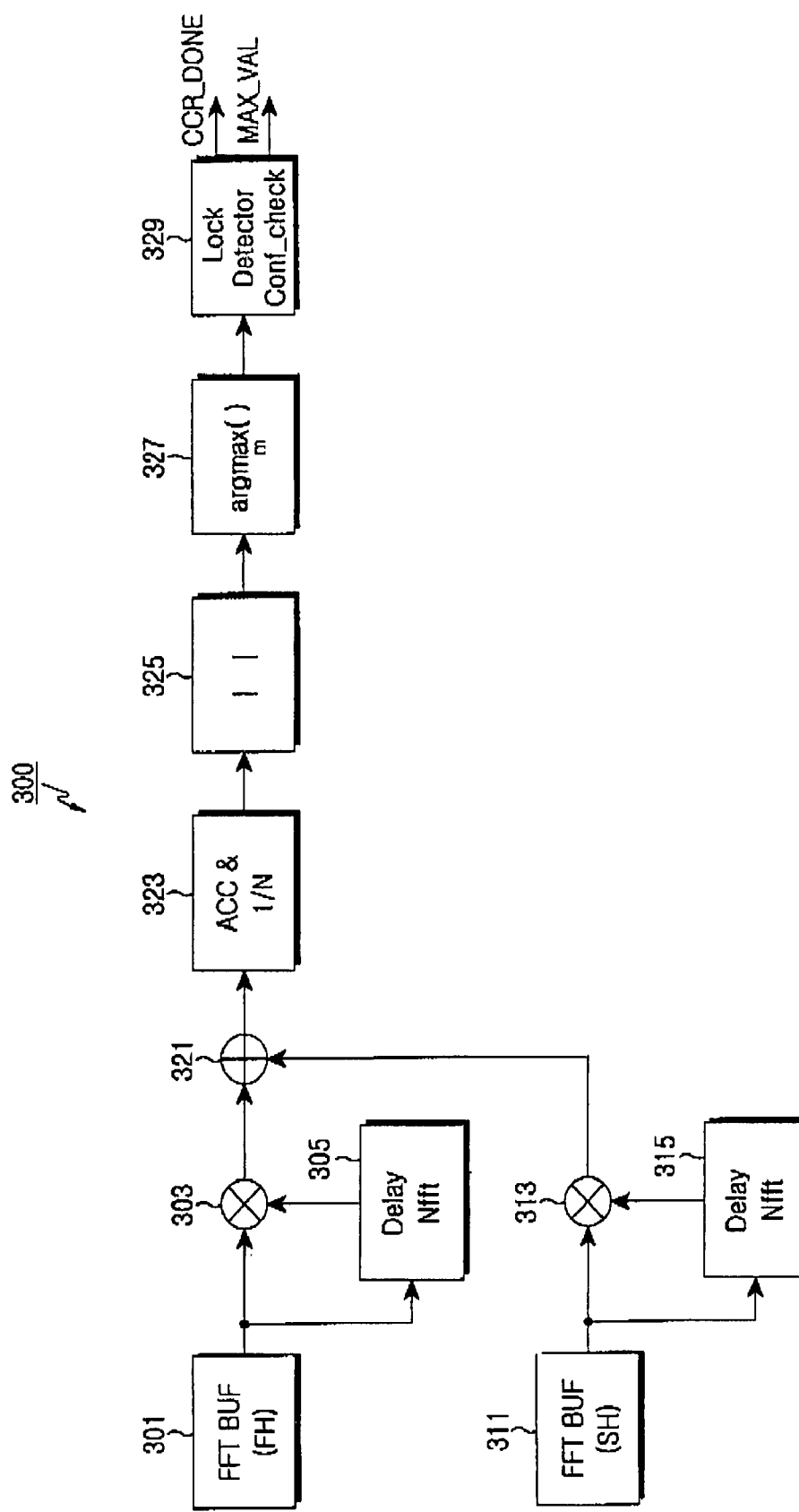
FIG. 3 illustrates a frequency detection apparatus for detecting a coarse carrier frequency offset value using a confidence check method.

FIG. 3 illustrates a frequency detection apparatus 300 for compensating for a coarse carrier frequency offset value using a confidence check method.

Referring to FIG. 3, the frequency detection apparatus 300 is equal to the coarse frequency detection apparatus of FIG. 2 up to the process of extracting a frequency index value having the maximum autocorrelation value. However, in order to increase the confidence reliability, a confidence checker 329 is added to the frequency detection apparatus 300. Accordingly, the frequency detection apparatus 300 using the confidence check method can improve its detection performance although it has a slight detection time delay compared with the frequency detection apparatus of FIG. 2.

Figure 4:
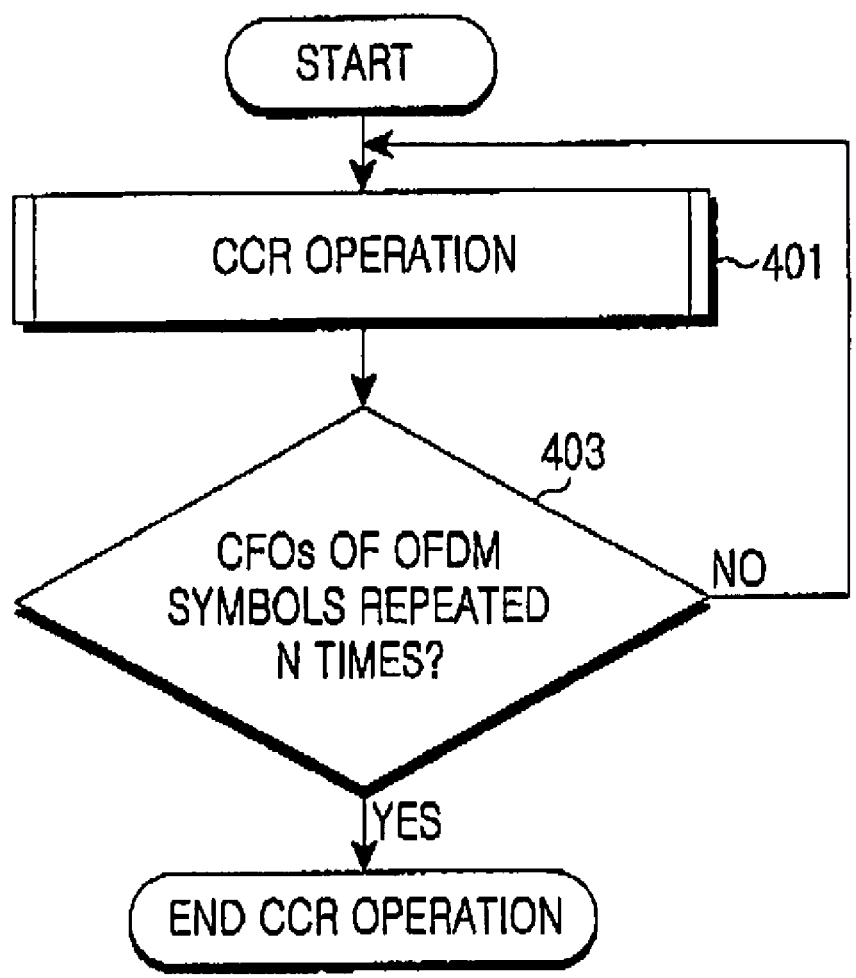
FIG. 4 illustrates a method for detecting a coarse carrier frequency offset value using a confidence check method.

FIG. 4 illustrates the coarse frequency detection method in the frequency detection apparatus 300.

Referring to FIGS. 3 and 4, the frequency detection apparatus 300 performs a CCR operation in step 401, and determines in step 403 whether CFOs of two adjacent OFDM symbols have been continually repeated with the same values a number N of times. If the adjacent OFDM symbols have been repeated with the same values N times, the frequency detection apparatus 300 ends the CCR operation, and then proceeds to a frame synchronization process. However, if the adjacent OFDM symbols have not been repeated with the same values N times, the frequency detection apparatus 300 repeats the CCR operation of step 401 until a CCR timer expires. For example, the frequency detection apparatus 300 checks whether a coarse carrier frequency offset value $\Delta_l^1$ obtained through CCR operations on the continual OFDM symbol_1 and symbol_2 is equal to a coarse carrier frequency offset value $\Delta f_l^2$ obtained through CCR operations on the continual OFDM symbol_2 and symbol_3, thereby determining the final coarse CFO.

The new coarse frequency detection apparatus uses the confidence check method and the soft combining method in combination.

The soft combining method continually accumulates autocorrelation values of pilot symbols for a frequency offset in an expanded range as many times as a symbol interval (or the desired number of accumulations (desired accumulation count)). In the accumulation process, autocorrelation values for the same frequency offsets are accumulated separately. For example, if a candidate frequency offset is −10~10, autocorrelation values for a total of 21 offsets are given, and 21 autocorrelation values are added according to each offset every symbol interval. That is, if the number of accumulations is set to 2, the soft combining method accumulates autocorrelation values at an offset −10 determined in a symbol 1 and autocorrelation values at the offset −10 determined in a symbol 2, and accumulates autocorrelation values at an offset −9 determined in the symbol 1 and autocorrelation values at the offset −9 determined in the symbol 2. The frequency offset having the maximum value among the accumulated autocorrelation values is determined as a frequency offset occurring between a transmitted signal and a received signal.

By accumulating the autocorrelation values for an interval of several symbols in this manner, the soft combining method can increase reliability of the autocorrelation values, making it possible to increase frequency offset detection performance even at a low Signal-to-Noise Ratio (SNR). However, a drawback of the soft combining method is that the method needs an additional memory for accumulating the calculation results. Generally, in the DVB-H system, because the SNR remains at about 3 dB, detection performance of the soft combining scheme is similar to that of the confidence check scheme at around the 3-dB SNR.

Therefore, the new coarse frequency detection apparatus according to the present invention can be properly used according to the channel environment with the use of the confidence check method and the soft combining method. That is, the simultaneous application of the two detection methods can satisfy the need for short detection time and accurate detection.

Figure 5:
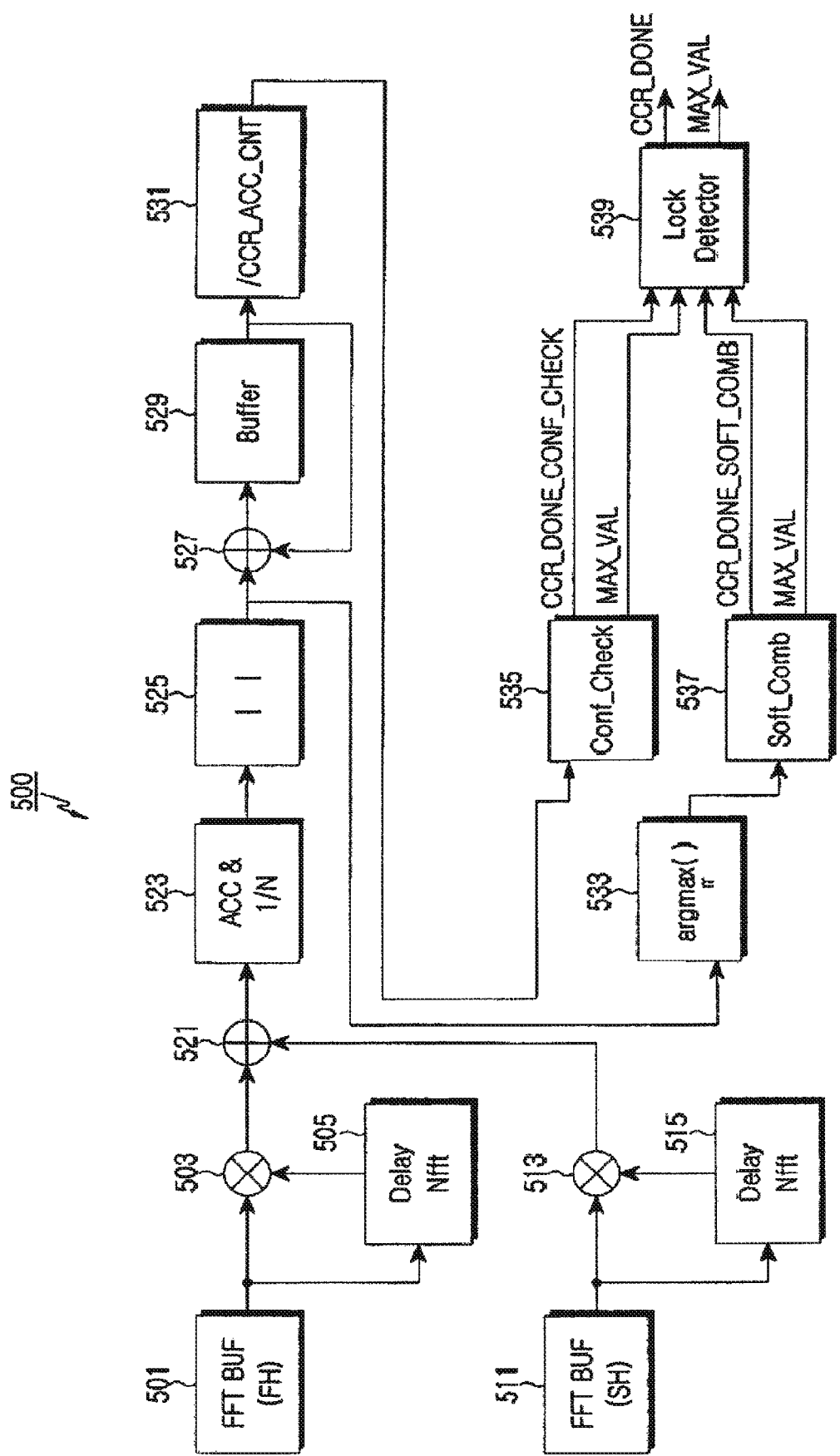
FIG. 5 illustrates a coarse frequency detection apparatus according to an embodiment of the present invention.

FIG. 5 illustrates a coarse frequency detection apparatus 500 according to an embodiment of the present invention.

Referring to FIG. 5, the coarse frequency detection apparatus 500, as it uses the confident check method and the soft combining method in combination, includes a Confidence Check Detector (CCD) 535 and a Soft Combining Detector (SCD) 537, and additionally includes a software-controllable register capable of controlling the detectors 535 and 537. The register can be included in a Lock Detector 539, or can be separately provided.

Before a detailed description of the coarse frequency detection apparatus 500 is given, it should be noted that function blocks 501 (First Half buffer) and 525 are equal to the corresponding function blocks of FIG. 2. Therefore, a description thereof will be omitted herein. After an absolute value calculator 525 calculates absolute values of autocorrelation values according to a coarse frequency index value, the coarse frequency detection apparatus 500 simultaneously performs a confidence check method and a soft combining method.

The confidence check method checks whether the same frequency index value is continually output as many times as a set number of symbols (symbol count), and the soft combining method accumulates autocorrelation values as many values as a set number of symbols, using a Buffer 529 and an accumulation counter and normalizer 531. Thereafter, the accumulation counter and normalizer 531 normalizes the accumulated values for bit optimization. A maximum value detector 533 detects the maximum frequency index value. The present invention performs the confidence check method and the soft combining method simultaneously.

For example, it is assumed that the number of confidence check symbols is 2 and the number of soft combining symbols is 2. The maximum frequency index value detected by the maximum value detector 533, at which a first autocorrelation value is found, is defined as 'f'. The result value detected by the CCD 535 and the result value detected by the SCD 537 are first input to the lock detector 539. Thereafter, the lock detector 539 determines whether the result of the confidence check detector 535 is 'f'. If the result is failed, the Lock Detector 539 checks the result of the SCD 537 and determines a frequency offset value according to the check result.

Figure 6:
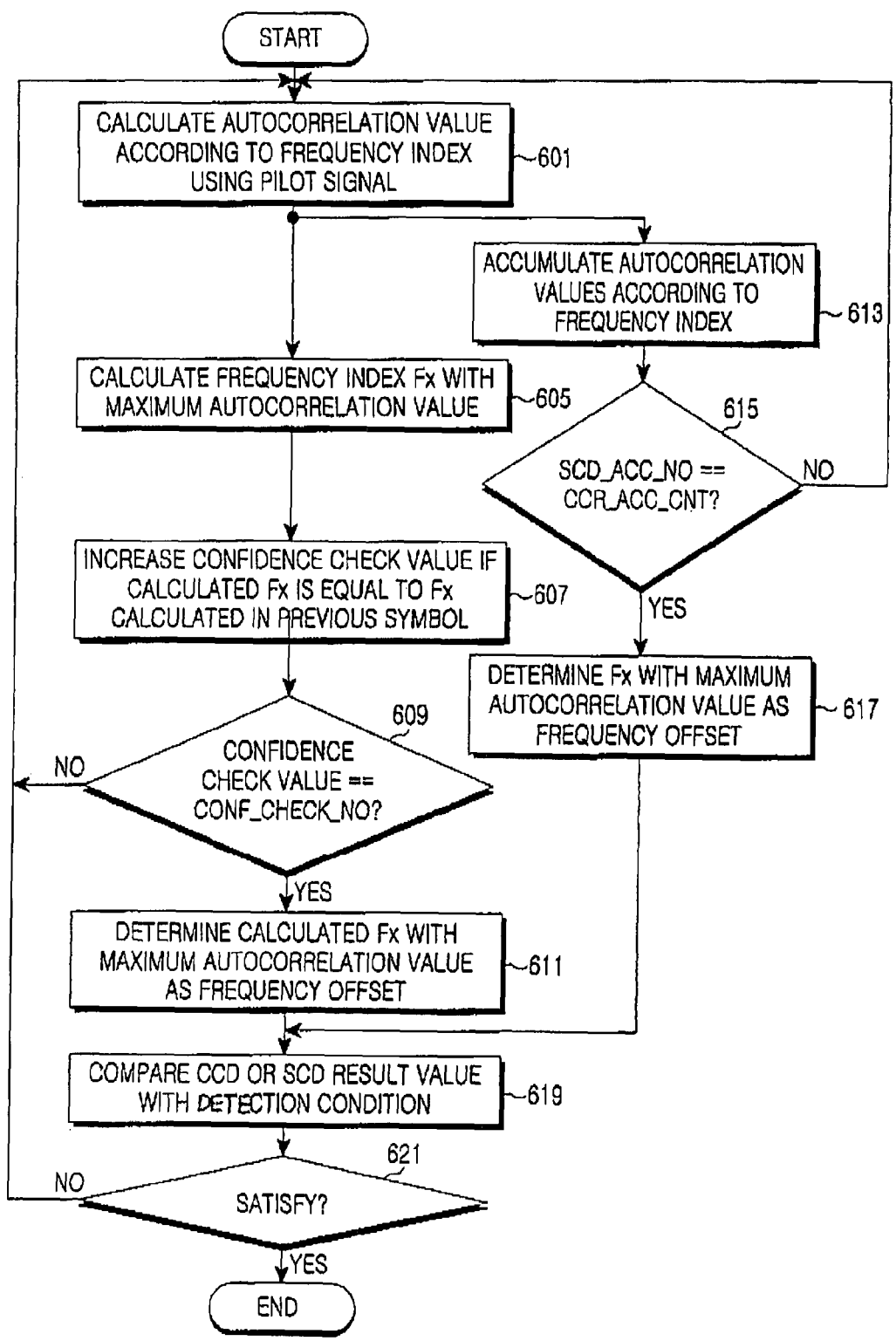
FIG. 6 illustrates a coarse frequency detection method according to an embodiment of the present invention.

With reference to FIG. 6, a detailed description will now be made of a new coarse frequency detection method according to an embodiment of the present invention. The new coarse frequency detection method selects one of the above two methods according to how a counter value allocated to each method is defined. That is, assuming that the channel environment is good, a small value is allocated to a Confidence Check Counter (CCC) corresponding to the confidence check detector 535 so that the confident check method can be used. When the channel environment is poor, a Soft Combining Accumulation Counter (SCAC) is allocated and a value greater than that in the CCC is allocated thereto so that the soft combining method can also be operated. The CCC and SCAC, although not separately illustrated in a drawing, can be included in the CCD 535 and the SCD 537, respectively, or can be implemented with separate registers.

If a CCR detector operates as an FFT block actually operates, the CCD 535 first operates. If this detector detects an accurate coarse frequency offset, there is no more need to perform the operation. However, if the CCD 535 fails in accurate coarse detection, it determines whether the accurate detection is made, considering even the simultaneously obtained result of the SCD 537.

Referring to FIGS. 5 and 6, as a coarse frequency detection operation starts, a coarse frequency detection apparatus 500 calculates in step 601 an autocorrelation value according to a frequency index value Fx for a pilot signal of a received symbol. In the present invention, the coarse frequency detection apparatus 500 simultaneously uses the confidence check method and the soft combining method. In the confidence check method, a maximum value detector 533 calculates a frequency index value Fx having the maximum autocorrelation value in step 605.

In step 607, a CCD 535 increases a confidence check value, if the frequency index value Fx is equal to a frequency index value Fx calculated in a previous symbol. Thereafter, if it is determined in step 609 that the increased confidence check value is equal to a maximum confidence check count CON-F_CHECK_NO, the coarse frequency detection apparatus 500 proceeds to step 611 where it determines the calculated frequency index value Fx having the maximum autocorrelation value as a frequency offset. In step 619, the coarse frequency detection apparatus 500 compares a Confidence Check Detection (CCD) result value with a detection condition. If the CCD result value satisfies the detection condition in step 621, the coarse frequency detection apparatus 500 ends a CCR operation. However, if the CCD result value does not satisfy the detection condition, the coarse frequency detection apparatus 500 returns to step 601.

In step 613, in order to use the soft combining method, the coarse frequency detection apparatus 500 accumulates autocorrelation values according to a frequency index for a pilot signal of a received symbol. Thereafter, the coarse frequency detection apparatus 500 determines in step 615 whether a Soft Combining Detection (SCD) accumulation count SCD_ACC_CNT is equal to a maximum accumulation symbol count CCR_ACC_CNT. If they are equal to each other, the coarse frequency detection apparatus 500 determines the frequency index value Fx having the maximum autocorrelation value as a frequency offset in step 617.

The frequency offset value calculated with use of the confidence check detection method and the soft combining method can be determined according to channel quality. In decision on the frequency offset, the frequency index value calculated by the confidence check method is determined as a frequency offset, and if the frequency offset in the confidence check method is not coincident with a condition, the frequency index value in the soft combining method is determined as a frequency offset. Thereafter, the coarse frequency detection apparatus 500 determines in step 621 whether the determined frequency offset value satisfies the detection condition.

The new coarse frequency detection method, as it simultaneously uses the confidence check detection method and the soft combining detection method, can directly refer to the result of the SCD 537 without receiving a new OFDM symbol even though it fails in coarse frequency detection, thereby reducing the frequency detection time.

Figure 7A:
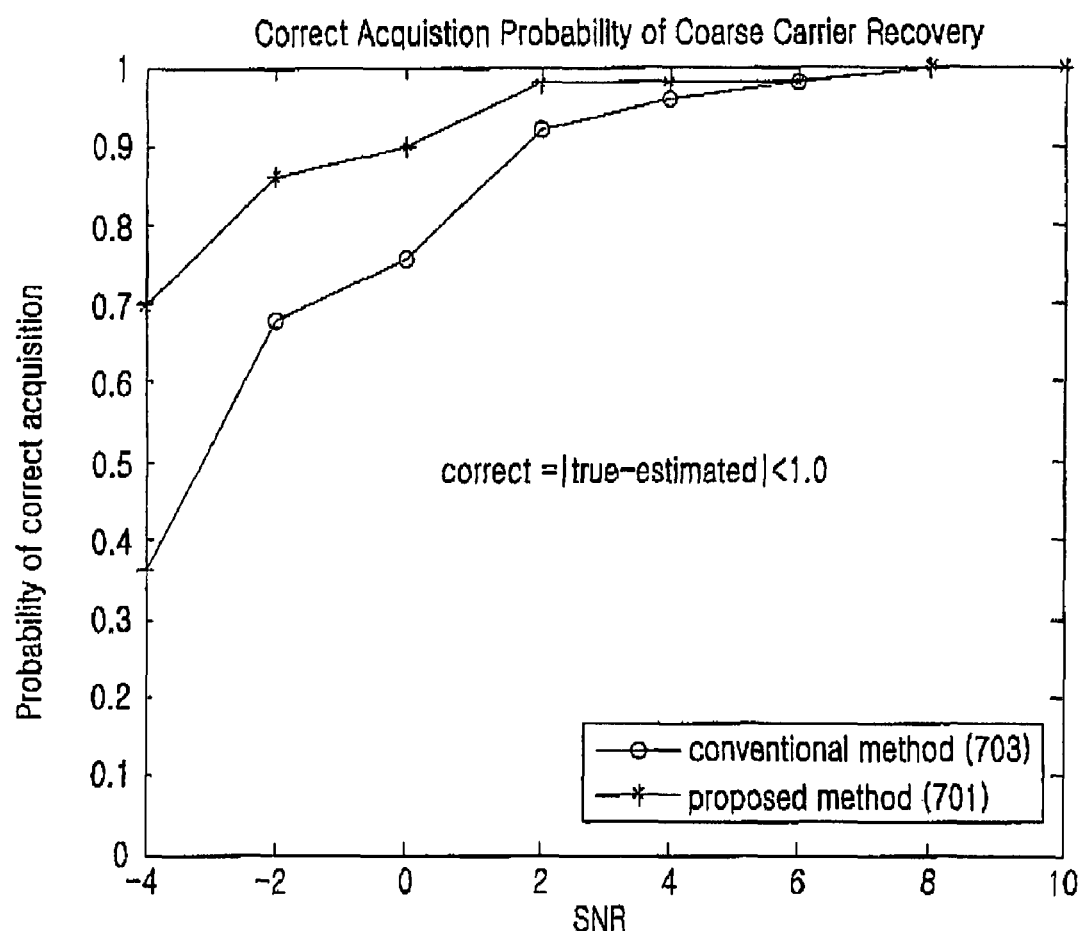
FIGS. 7A and 7B illustrate performance comparison between an existing coarse frequency detection method and a new coarse frequency detection method.
Figure 7B:
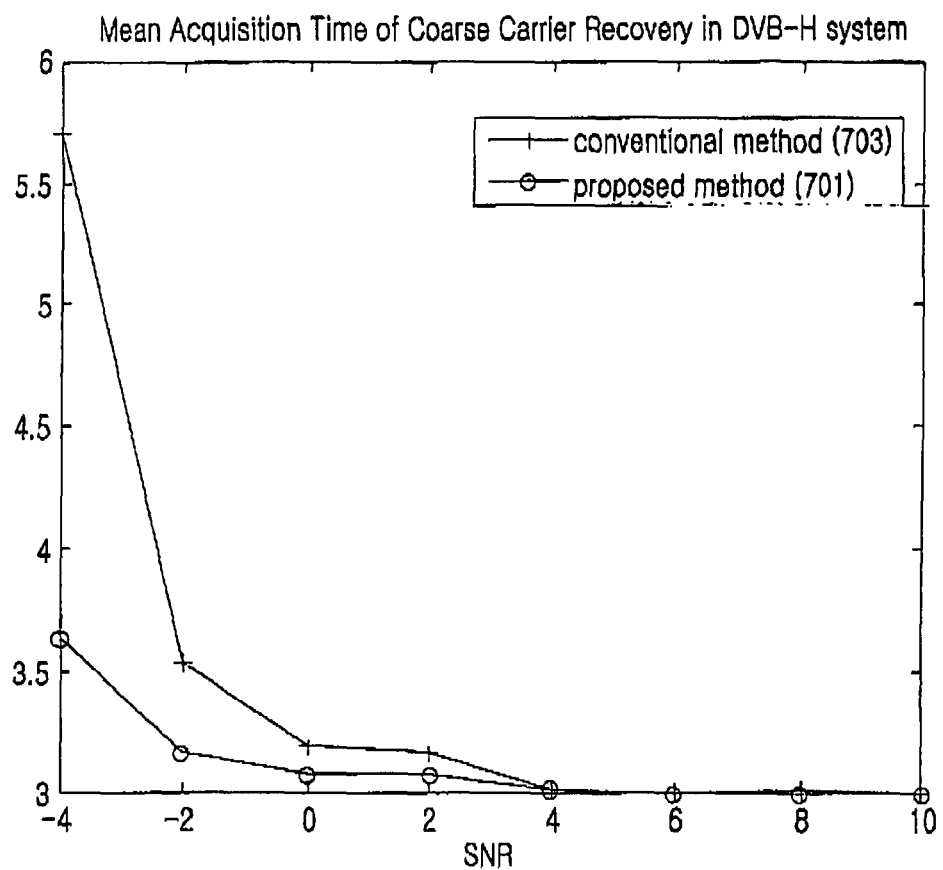

With reference to FIGS. 7A and 7B, a description will now be made of performance comparison between the existing coarse frequency detection method and the new coarse frequency detection method.

FIG. 7A illustrates coarse frequency detection performance according to SNR. Herein, the horizontal axis indicates SNR, and the vertical axis indicates probability that a correct frequency offset value will be acquired. It can be seen from FIG. 7A that a performance difference between the disclosed coarse frequency detection method 701 and the conventional coarse frequency detection method 703 is greater at a lower SNR. In particular, the difference can be 30% or more at an SNR of −4 dB. That is, it can be noted that the new coarse frequency detection method 701 is superior in performance to the conventional coarse frequency detection method 703.

FIG. 7B illustrates a mean detection time of a coarse frequency according to SNR. Similarly, the horizontal axis indicates SNR, and the vertical axis indicates a mean detection time required for detecting a coarse frequency offset value. It can be seen from FIG. 7B that a difference in the coarse frequency detection time between the disclosed coarse frequency detection method 701 and the conventional coarse frequency detection method 703 is greater at a lower SNR.

As can be understood from the foregoing description, the present invention supports both the confidence check method and the soft combining method. Therefore, if the coarse frequency offset detection fails in the confidence check method, the present invention uses the soft combining method without the need for receiving a new OFDM symbol. In addition, with the use of the soft combining method having higher performance at a lower SNR, the present invention can rapidly adapt to a change in channel, contributing to minimization of the ICI.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for detecting a frequency offset in an Orthogonal Frequency Division Multiplexing (OFDM) system, the method comprising:

determining, in an accumulation counter, a first frequency index based on autocorrelation values calculated according to a frequency index for a pilot signal of a received symbol;

accumulating the autocorrelation values calculated according to the frequency index for the pilot signal of the received symbol depending on a symbol count, and determining a second frequency index based on the accumulated autocorrelation values; and determining at least one of the first frequency index and the second frequency index as a frequency offset according to channel quality.

2. The method of claim 1, wherein determining the first frequency index further comprises:

selecting a frequency index corresponding to the maximum autocorrelation value among the autocorrelation values based on the frequency index in the pilot signal of the received symbol; and determining the selected frequency index as the first frequency index if the selected frequency index is equal to a frequency index calculated in a previous symbol a set number of times.

3. The method of claim 1, wherein determining the second frequency index further comprises:

accumulating the calculated autocorrelation values and autocorrelation values in a previous symbol; and determining a frequency index having the maximum autocorrelation value as the second frequency index if the accumulated count is the maximum symbol accumulation count.

4. The method of claim 1, wherein determining the at least one of the first frequency index and the second frequency as a frequency offset further comprises:

determining the first frequency index as a frequency offset if the channel quality is higher than a threshold; and determining the second frequency index as a frequency offset if the channel quality is lower than the threshold.

5. The method of claim 4, wherein the channel quality is a Signal-to-Noise Ratio (SNR) of the received pilot signal.

6. The method of claim 1, further comprising calculating an autocorrelation value according to the pilot signal of the received symbol and a range that is defined taking an error into account.

7. The method of claim 1, wherein the frequency index indicates a position of a continual pilot for each Fast Fourier Transform (FFT) mode for digital video broadcasting (DVB-H) system.

8. An apparatus for detecting a frequency offset in an Orthogonal Frequency Division Multiplexing (OFDM) system, the apparatus comprising:

first means for determining a first frequency index based on autocorrelation values calculated according to a frequency index for a pilot signal of a received symbol;

second means for accumulating the autocorrelation values calculated according to the frequency index for the pilot signal of the received symbol depending on a symbol count, and determining a second frequency index based on the accumulated autocorrelation values; and a lock detector for determining at least one of the first frequency index and the second frequency index as a frequency offset according to channel quality.

9. The apparatus of claim 8, wherein the first means comprises:

a maximum value detector for detecting a maximum autocorrelation value among the autocorrelation values based on the frequency index in the pilot signal of the received symbol; and a soft combining detector for determining the selected frequency index as the first frequency index if a frequency index corresponding to the detected maximum value is equal to a frequency index calculated in a previous symbol a set number of times.

10. The apparatus of claim 8, wherein the second means comprises:
a buffer for accumulating the calculated autocorrelation values and autocorrelation values in a previous symbol;
a counter for counting a number of accumulations in the buffer; and
a confidence check detector for determining a frequency index having a maximum autocorrelation value as the second frequency index if the accumulated count is the maximum symbol accumulation count.

11. The apparatus of claim 8, wherein the lock detector:
determines the first frequency index as a frequency offset if the channel quality is higher than a threshold; and
determines the second frequency index as a frequency offset if the channel quality is lower than the threshold.

12. The apparatus of claim 11, wherein the channel quality is a Signal-to-Noise Ratio (SNR) of the received pilot signal.

13. The apparatus of claim 8, further comprising calculating an autocorrelation value according to the pilot signal of the received symbol and a range that is defined taking an error into account.

14. The apparatus of claim 8, wherein the frequency index indicates a position of a continual pilot for each Fast Fourier Transform (FFT) mode for digital video broadcasting (DVB-H) system.

15. A method for detecting a frequency offset in an Orthogonal Frequency Division Multiplexing (OFDM), the method comprising:
determining, using a confidence check detector, a frequency index using a confidence check scheme for a pilot signal of a received symbol;
determining a frequency index using a soft combining scheme for the pilot signal of the received symbol;
detecting the frequency index of the confidence check scheme as the frequency offset, if a received channel quality is higher than or equal to a threshold; and
detecting the frequency index of the soft combining scheme as the frequency offset if the received channel quality is lower than the threshold.

16. An apparatus for detecting a frequency offset in an Orthogonal Frequency Division Multiplexing (OFDM), the apparatus comprising:
first means for determining a frequency index using a confidence check scheme for a pilot signal of a received symbol;
second means for determining a frequency index using a soft combining scheme for the pilot signal of the received symbol; and
a controller for detecting the frequency index of the confidence check scheme as a frequency offset, if a received channel quality is higher than or equal to a threshold, wherein the controller is configured to detect the frequency index of the soft combining scheme as the frequency offset if the received channel quality is lower than the threshold.

* * * * *